United States Patent [19]
Noguchi et al.

[11] Patent Number: 5,179,655
[45] Date of Patent: Jan. 12, 1993

[54] MULTIWINDOW CONTROL METHOD AND APPARATUS FOR WORK STATION HAVING MULTIWINDOW FUNCTION

[76] Inventors: Yasuhiro Noguchi, Asukaryo 307, 1-5, Ishinazakacho-1-chome, Hitachi-shi; Toshiyuki Kuwana, Hitachi Tokawa Apartment 134, 1140, Tokawa, Hadano-shi; Yukio Funyu, 201, Awano, Nakagocho, Kitaibaraki-shi, all of Japan

[21] Appl. No.: 493,875

[22] Filed: Mar. 15, 1990

Related U.S. Application Data

[63] Continuation of Ser. No. 58,273, Jun. 4, 1987.

[30] Foreign Application Priority Data

Jun. 5, 1986 [JP] Japan ................... 61-129298

[51] Int. Cl.⁵ ............... G06F 3/153; G09G 5/14
[52] U.S. Cl. .................. 395/158; 395/159; 340/721; 340/734
[58] Field of Search .............. 364/521, 518; 340/721, 340/734, 724, 723; 395/158, 159, 157

[56] References Cited

U.S. PATENT DOCUMENTS

| | | | |
|---|---|---|---|
| 4,414,628 | 11/1983 | Ahuja et al. | 364/200 |
| 4,533,910 | 8/1985 | Sukonick et al. | 340/721 |
| 4,736,309 | 4/1988 | Johnson et al. | 364/521 |
| 4,761,642 | 8/1988 | Huntzinger | 340/721 |
| 4,868,765 | 9/1989 | Diefendorff | 364/521 |

OTHER PUBLICATIONS

"Workstation Capable of Covering Fields Not Covered by Existing Computers", Nikkei Electronics, May 23, 1983, pp. 149–172.

*Primary Examiner*—Gary V. Harkcom
*Assistant Examiner*—Raymond J. Bayer

[57] ABSTRACT

An Icon window display area taking precedence over all other display areas is disposed in the display screen. A window which becomes invisible at generation of a new window, a window size change of an existing window, or a position change of an existing window is reduced to a predetermined size so as to be displayed in a new Icon window display area.

3 Claims, 7 Drawing Sheets

MULTIWINDOW CONTROL METHOD AND APPARATUS FOR WORK STATION HAVING MULTIWINDOW FUNCTION

This is a continuation of application Ser. No. 058,273, filed Jun. 4, 1987.

BACKGROUND OF THE INVENTION

The present invention relates to an engineering work station to be used for computer aided design (CAD), computer aided engineering (CAE), etc. and in particular, to a multiwindow control method and an apparatus using the same for a workstation having a multiwindow function to effect a simultaneous processing of a plurality of processes.

The conventional multiwindow control method, as described in the JP-A-60-205492 and JP-A-57-125989, provides a scheme to discriminate visible windows. For example, according to the JP-A-60-205492, a window to which data can be inputted is called a current window and a window to which data cannot be inputted is called a noncurrent window, wherein the window ready for operation is notified to the operator by use of different brightness or luminance between the current windows and the noncurrent window. In the method of the JP-A-57-125989, when multi-windows are overlapped at least partially overlapped, a portion of the window into which data will be inputted is distinguished from the other portions in such manner that data will be highlighted with white.

However, a case where a window is completely covered by other windows and becomes (to be) invisible to the operator has not been considered at all.

Namely, according to the prior art technology above, it has not been considered how to process such a window concealed by other windows when a plurality of windows are generated. As a consequence, when a plurality of windows are generated and a window to be processed by the operator is completely concealed by other windows, a window delete or a window a push (a function to set the specified window to the last position among the windows) operation must be effected many times to attain the desired window, which leads to a problem that the operability is greatly deteriorated.

Moreover, when a job program associated with the invisible window thus concealed is executed to run, a load is imposed on the CPU of the system, which results in a problem that the performance of the system such as the operability is lowered due to a cause which cannot be recognized by the operator.

SUMMARY OF THE INVENTION

It is therefore an object of the present invention to provide a multiwindow control method and an apparatus using the same for a work station having a multiwindow function in which the number of windows generated by the apparatus on which the operator is conducting an operation and the number of programs in the run state are notified to the operator, thereby enabling an arbitrary window (or an arbitrary job program) to be set as an operation objective through a single operation.

The gist of the present invention resides in there being provided a window display area taking precedence over all other display areas so that during operations of generating a new window, altering the window size of a beforehand generated window, or moving a concealed window by relocation or rearranging the window as an icon which an operator can recognize or identify as the concealed window. The Icon is displayed in the window display area.

According to the present invention, the windows generated on the screen are entirely controlled for the display by the CPU, and hence if they are not deleted by the operator, the windows are kept displayed in some kind of format on the screen. This enables the operator to visually recognize all windows thus generated and the states thereof (whether the job program associated with the window is being executed or not) and to set an arbitrary window on the screen to be an operation objective through a single operation.

BRIEF DESCRIPTION OF THE DRAWINGS

The present invention will be apparent from the following detailed description taken in conjunction with the accompanying drawings, in which.

DESCRIPTION OF THE PREFERRED EMBODIMENTS

Figure 2:
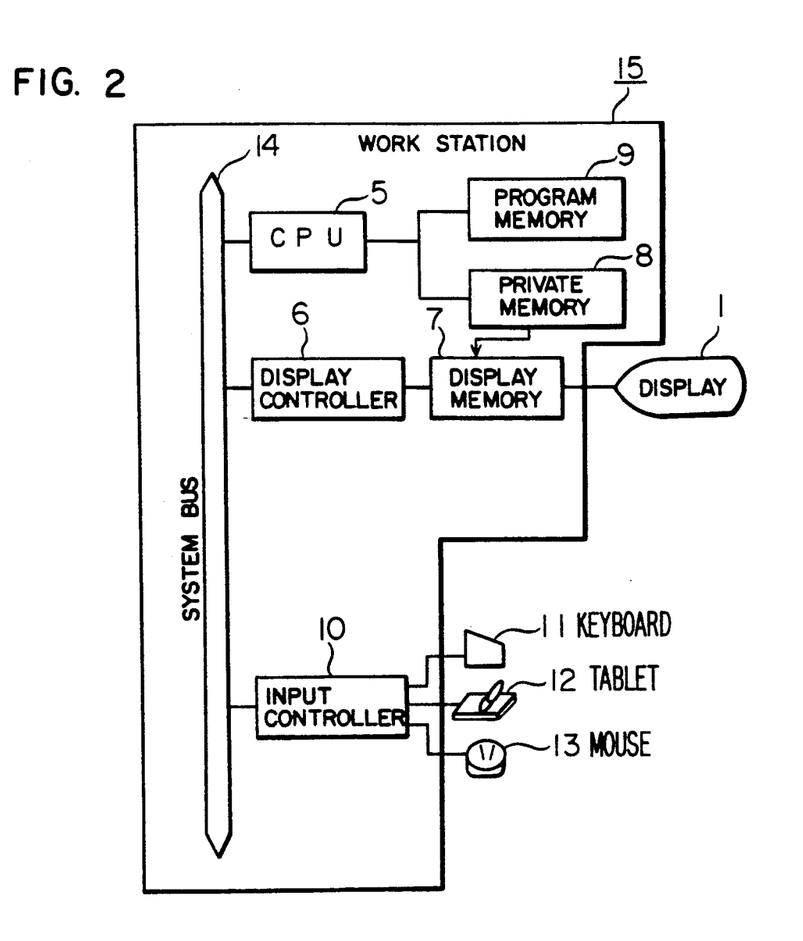
FIG. 2 is a schematic block diagram illustrating an example of an apparatus executing the multiwindow control method according to the present invention.

The present invention will be described with reference to FIG. 2 showing the system configuration diagram of an embodiment of a work station to which the present invention is applied. In this configuration, a keyboard 11, a tablet 12, and a mouse 13 disposed as input devices are connected to a system bus 14 via an input controller 10 of a work station 15. A central processing unit (to be referred to as a CPU herebelow) 5 is connected to the system bus 14. Moreover, in a private memory 8 connected to the CPU, there are stored a window control table 81 for controlling windows to be set from the input devices (11, 12, 13), a display priority control table 82, an Icon window control table 83, a current cursor coordinate value buffer 84 for indicating an indication point from the input devices, and a specified coordinate value store buffer 85 for temporarily storing coordinate values specified from the input devices shown in FIGS. 3 and 4a–d. In order to increase the execution speed of a sequence of display operations, the private memory 8 is also connected to a display memory 7. Furthermore, the CPU 5 is connected to a program memory 9 for storing programs to execute a sequence of processing.

Moreover, the system bus 14 is connected to a display controller 6, which controls the display memory 7 to change the display content on a display 1.

Figure 9:
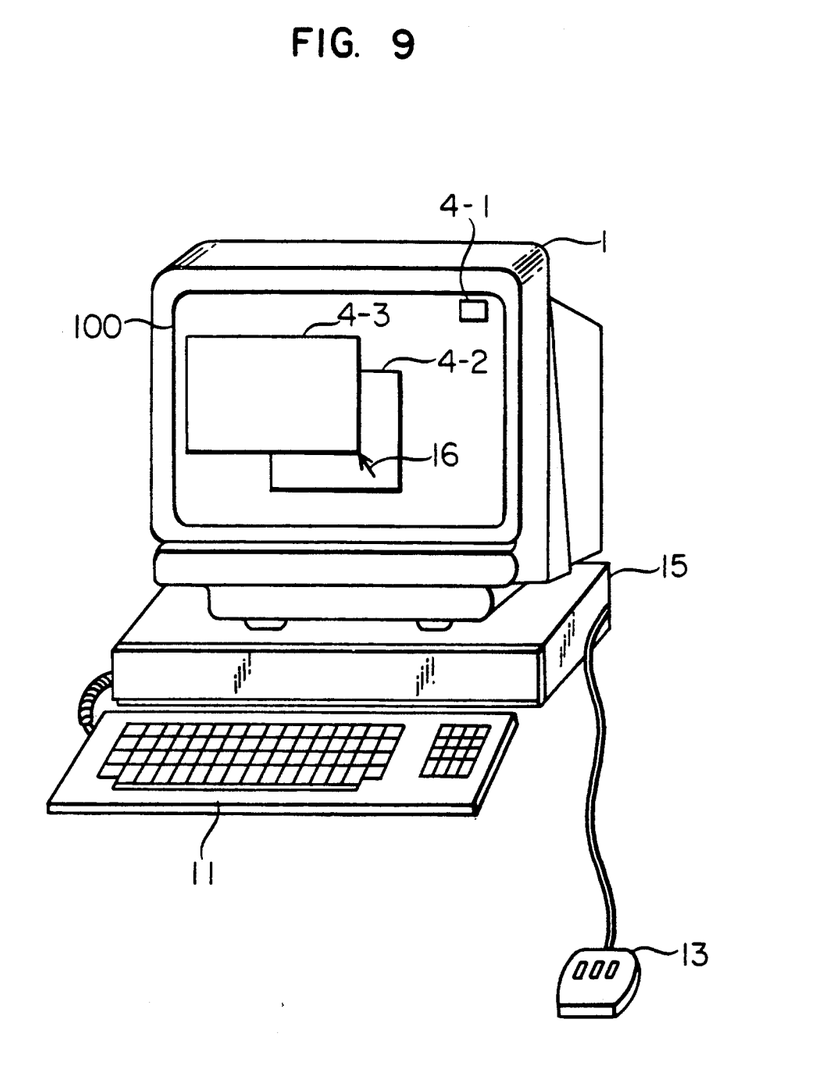
FIG. 9 is a schematic diagram illustrating an appearance of the apparatus to which the present invention is applied.

FIG. 9 shows an appearance of the apparatus viewed from the user side in which the keyboard 11 and the mouse 13 are used as the input devices.

Figure 3:
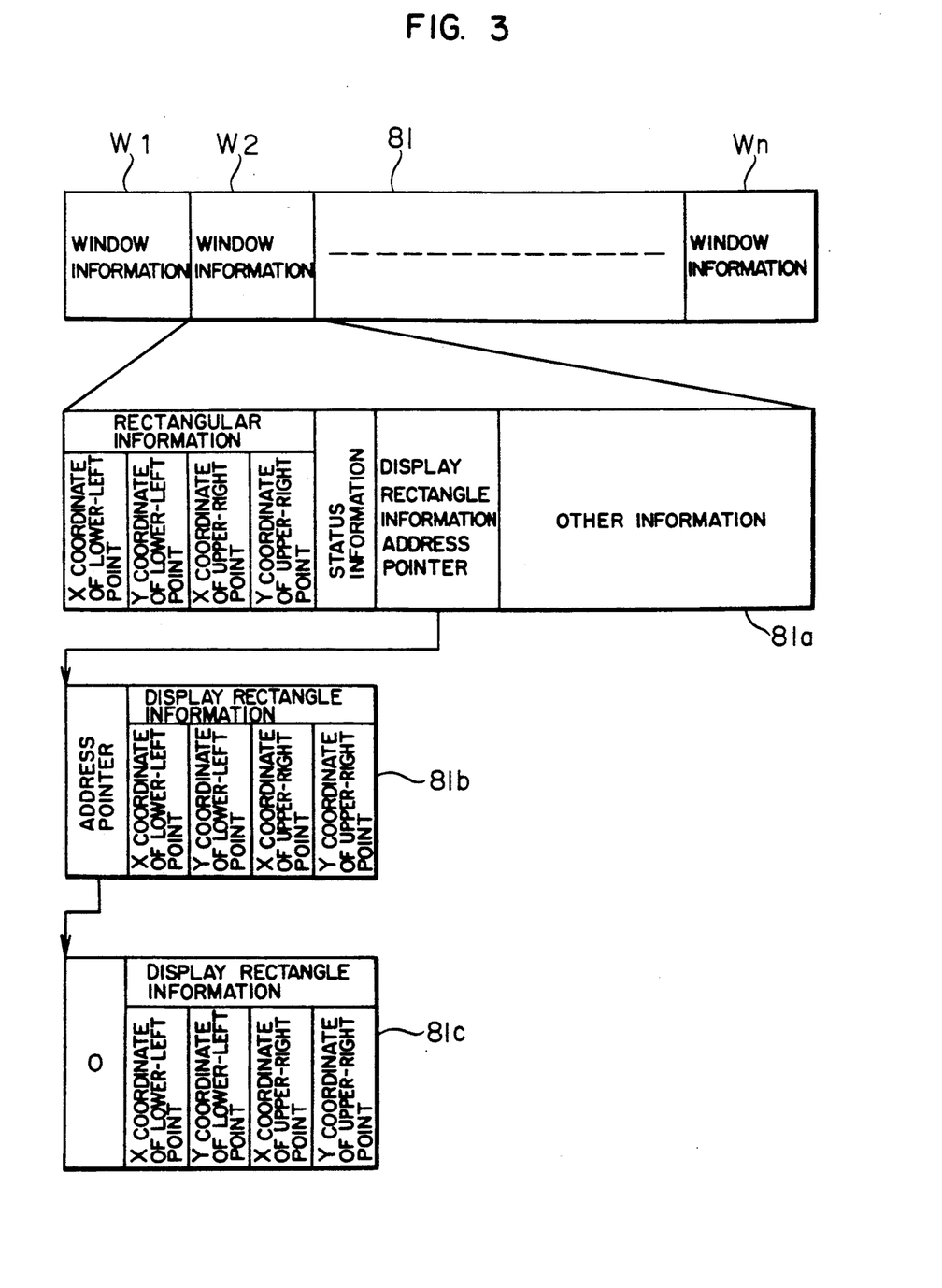
FIG. 3 is an explanatory diagram useful for explaining a window control table in a private memory of FIG. 2.

FIG. 3 is a schematic diagram illustrating an example of the window control table 81 stored in the private memory 8. As shown in this diagram, the window control table 81 comprises window information items $W_1$-$W_n$ (corresponding to n windows). Each of the window information items $W_1$-$W_n$ is configured with window rectangle information items 81a, 81b, and 81c as specifically shown for the window information $W_2$. Namely, the window rectangle information 81a includes a rectangle information indicating the position of the window on the display screen, namely, an x coordinate of the lower-left point, a y coordinate of the lower-left point, an x coordinate of the upper-right point, and a y coordinate of the upper-right point, a status information indicating whether the rectangle information is associated with an Icon window or an ordinary window, an address pointer indicating the rectangle information 81b, and other information. The window rectangle information 81b indicated by the address pointer includes an address pointer indicating the window rectangle information 81c and a display rectangle information. Moreover, the window rectangle information 81c is also of the same configuration.

That is, the window control table 81 is constituted from n window information items each comprising the window rectangle information items 81a, 81b, and 81c. Each of the window rectangle information items 81a, 81b, and 81c includes a rectangle information related to an ordinary window or a rectangle information associated with an Icon window disposed according to the present invention. For example, the window rectangle information 81a contains a rectangle information concerning an ordinary window, where as the window information items of the window rectangle information items 81b and 81c respectively relate to a first Icon window and a second Icon window disposed according to the present invention.

Figure 1:
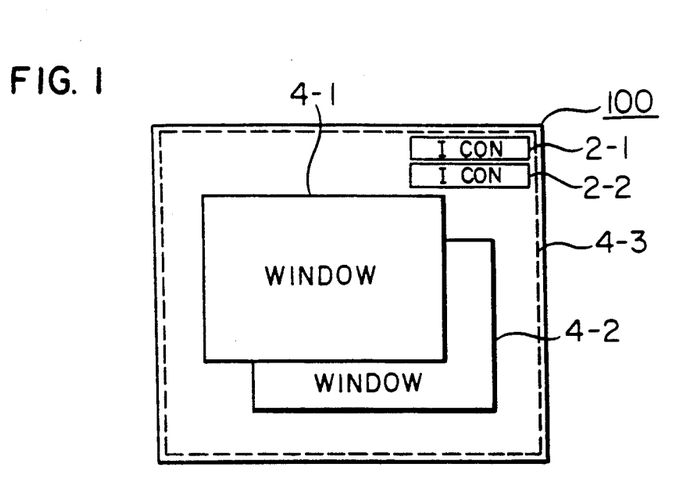
FIG. 1 is a schematic diagram illustrating an example of a display image according to the multiwindow control method of the present invention.

Here, the Icon windows are, as shown in FIG. 1, windows 2-1, 2-2, etc. each having the display priority which cannot be concealed by ordinary windows 4-1, 4-2, etc. in a display screen 100 of the display. For example, when a window 4-3 is additionally displayed in the display screen 100, the existing windows 4-1 and 4-2 are concealed, but the contents of these windows 4-1 and 4-2 are displayed in the Icon windows 2-1 and 2-2.

Figure 4A:
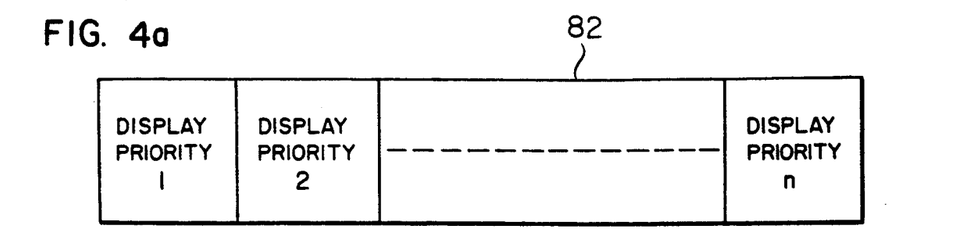
FIG. 4a is an explanatory diagram for explaining a display priority control table in the private memory of FIG. 2.
Figure 4B:
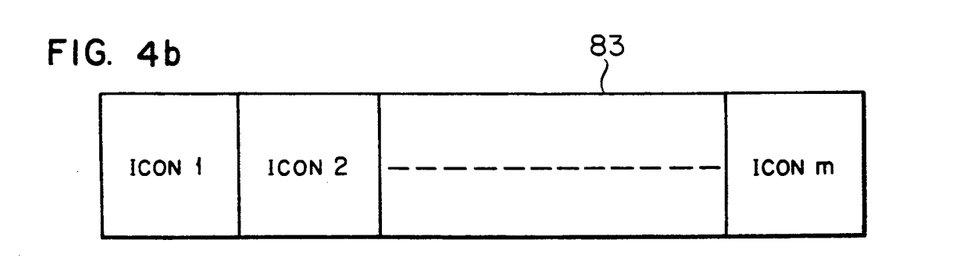
FIG. 4b is an explanatory diagram for explaining an Icon window table in the private memory of FIG. 2.
Figure 4C:
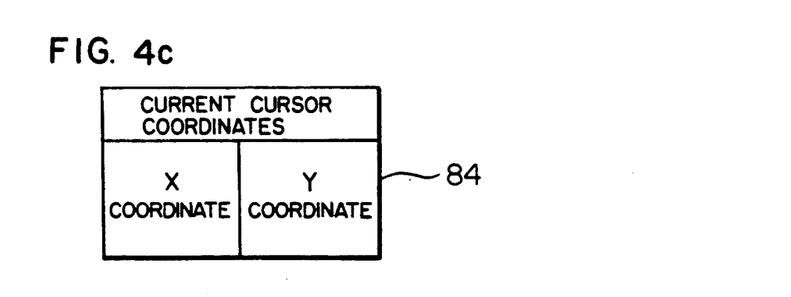
FIG. 4c is a schematic diagram illustrating a current cursor coordinate buffer in the private memory of FIG. 2.
Figure 4D:
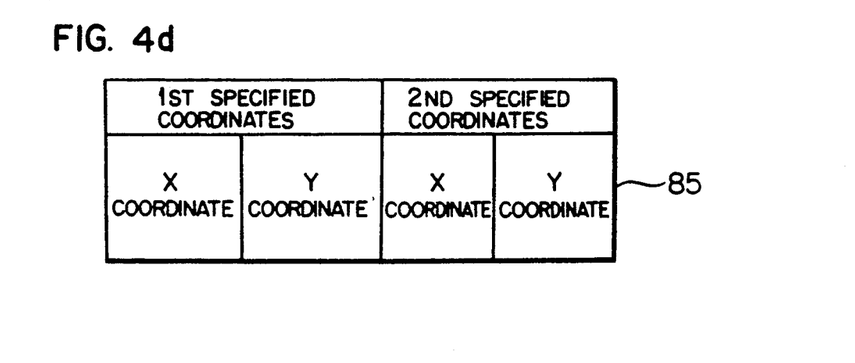
FIG. 4d is a schematic diagram showing a specified coordinate value store buffer in the private memory of FIG. 2.

FIG. 4a shows the contents of the display priority control table 82 in the private memory 8, whereas FIG. 4b indicates the Icon window table 83 in the private memory 8. Moreover, FIG. 4c shows the contents of the current cursor coordinate value buffer 84 in the private memory 8, whereas FIG. 4d indicates the specified coordinate value store buffer 85 in the private memory 8.

The display priority control table 82 is used to indicate the priority in a case where ordinary windows are displayed in the screen 100, whereas the Icon window table 83 is prepared to store the window numbers corresponding to the window information Wi (i=1 to n) to be displayed in the m Icon windows disposed according to the present invention. For example, the window information Wi having the number stored in an area assigned with the display priority 1 in the display priority control table 82 takes the highest priority for the display in the screen. In addition, the window information Wi having the window number stored in the area of the Icon 1 window in the Icon window table 83 is displayed in the Icon 1 window. In this embodiment, as shown in FIG. 1, although two Icon windows are provided, the number of Icon windows can be arbitrarily selected. Moreover, the Icon window has a display priority not to be concealed by ordinary windows.

The current cursor coordinate value buffer 84 stores the coordinate values currently indicated by one of the input devices such as a mouse and the coordinate values are indicated by a cursor 16 on the display equipment for the user (FIG. 9). In addition, the specified coordinate value store buffer 85 temporarily stores the coordinate values specified by means of an input device such as a mouse.

Next, a description will be given of an embodiment of FIG. 2.

Assume here a sequence of window generate programs stored in the program memory 9 are being executed by use of the private memory 8 under control of the CPU 5. When the mouse 13 or the tablet 12 is operated, a coordinate value signal representing coordinate values is delivered via the input controller 10 and the system bus 14 to the CPU 5. On receiving the coordinate value signal, the CPU 5 updates the corresponding content of the current cursor coordinate value buffer 84 with the coordinate values thus received and then writes the coordinate values for the cursor in the display memory 7. The cursor thus written in the display memory 7 is displayed on the display 1 to indicate the current cursor indication point to the user. When the user specifies a desired point, the coordinate values associated with the cursor are stored in the specified coordinate value store buffer 85 in the private memory 8.

Figure 5A:
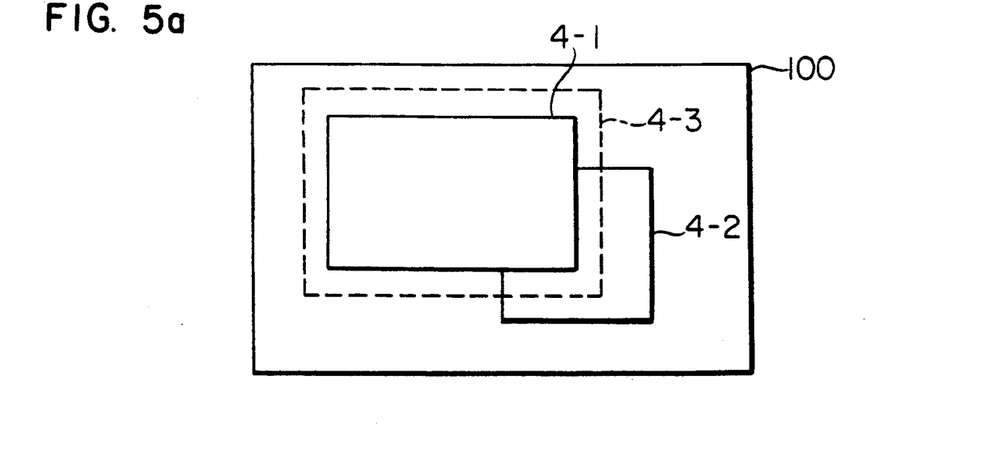
FIGS. 5a–5c are schematic diagrams illustrating concrete examples of window control according to the present embodiment and the prior art technology.

Let us consider a case to generate a new window as shown in FIG. 5a. In the display screen 100 of the display 1, there have already been the windows 4-1 and 4-2 beforehand generated. A new window 4-3 is to be additionally generated on the display screen 100. As shown in FIG. 5a, the new window 4-3 to be generated completely conceals the existing window 4-1 and partially overlaps with the existing window 4-2. A sequence of window control procedures for generating the new window 4-3 will be described by use of FIGS. 5a-5c, the flowcharts of FIGS. 6-8, and the table configuration diagrams of FIGS. 3 and 4a-4d.

Figure 6:
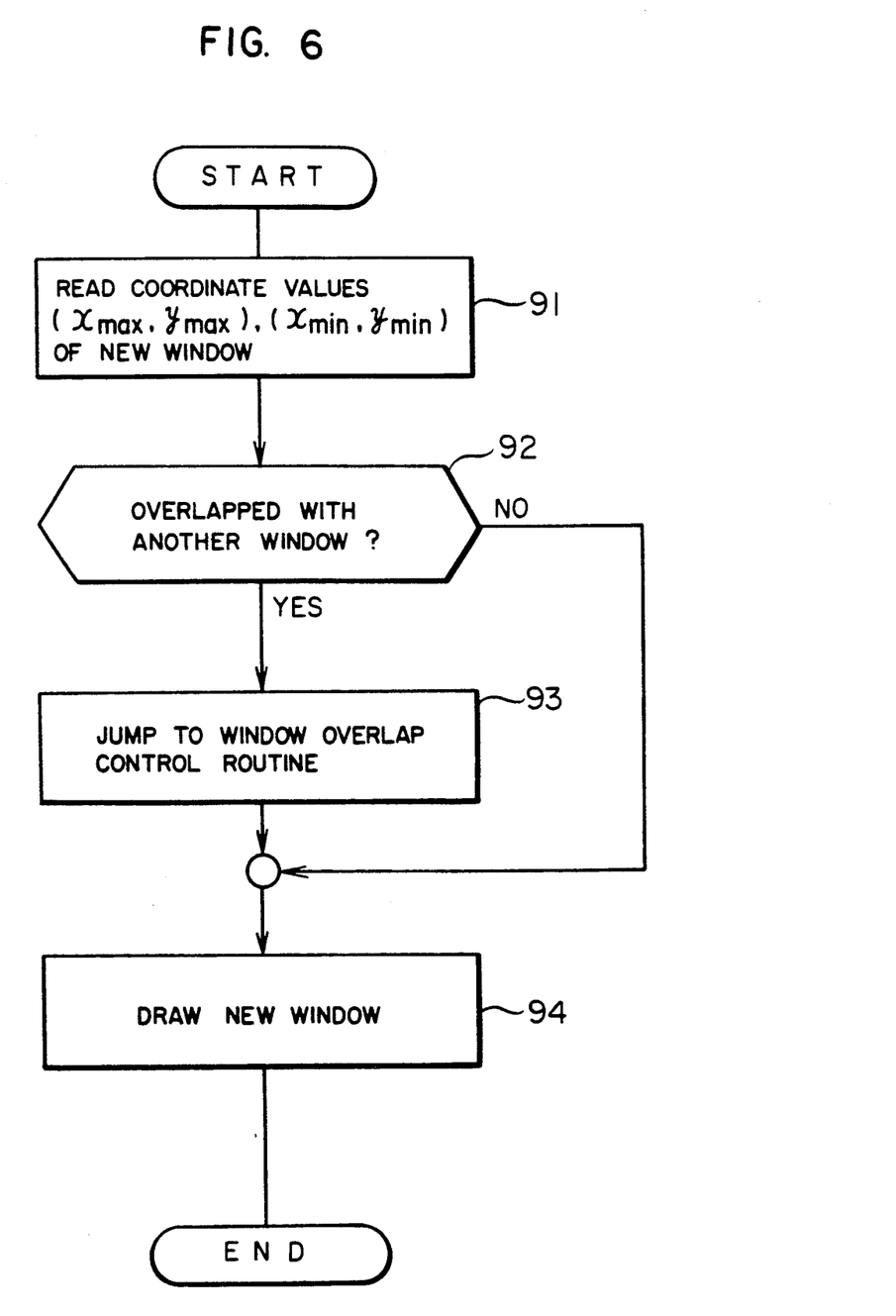
FIGS. 6–8 are flowcharts useful for explaining the operation of the embodiment of FIG. 2.

First, according to the window generate procedure of FIG. 6, processing 91 is executed to obtain the rectangle information of the new window 4-3 to be generated i.e. the coordinate values $(X_{max}, Y_{max})$ $(X_{min}, Y_{min})$ on the display screen 100 and the window number 4-3. In general, these information items are generally set by the user by means of an input device such as a mouse 13 through an interactive operation.

That is, as shown in FIG. 9, the user specifies the diagonal points of an objective window from the mouse 13 disposed as an input device. The coordinate values of these diagonal points specified are stored in the specified coordinate value store buffer 85. Based on the stored coordinate values, the CPU 5 calculates and reads the rectangle coordinate values (x and y coordinate values of the lower-left and upper-right points) of the window 4-3 to be additionally generated (processing 91).

Next, processing 92 is executed to check for an overlap with the existing windows 4-1 and 4-2. If no overlap takes place with respect thereto, a window drawing operation is achieved in the display 1 depending on the obtained rectangular information, namely, the rectangular information and the display rectangle information in the window information having the pertinent number in the window control table 81 of FIG. 3 are set to the $(X_{max}, Y_{max})$ and $(X_{min}, Y_{min})$, respectively. Moreover, the window number is stored in the area having the display priority 1 in the display priority control table 82 of FIG. 4a and then processing 94 is executed to decrease the display priority of the other windows by one, thereby completing the sequence of processing.

Figure 7:
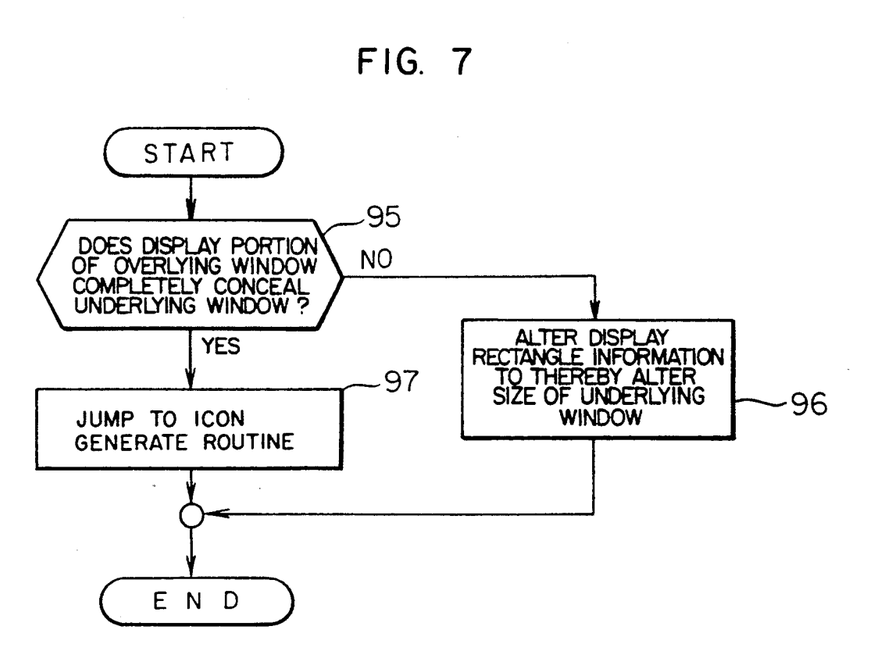
Figure 8:
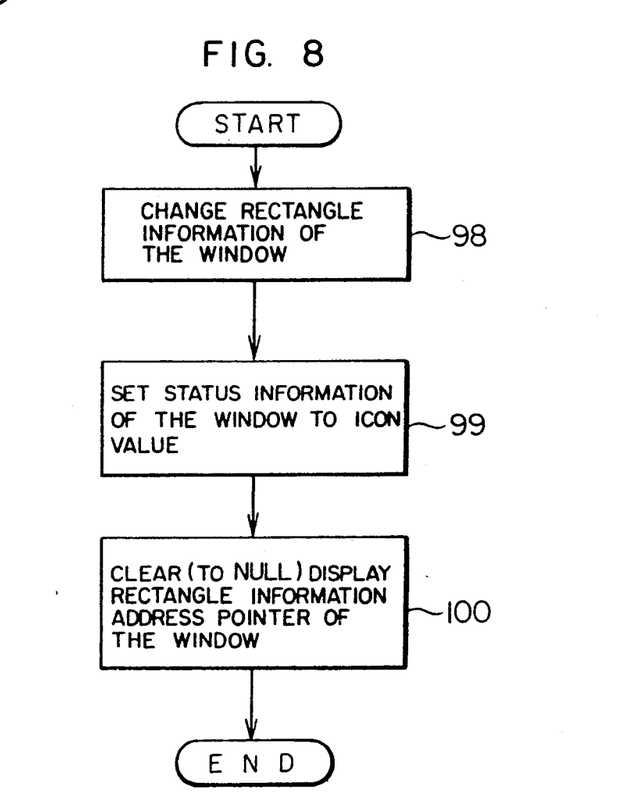

In the processing 92, if the overlap with other window 4-1 or 4-2 is found as a result of the judgement, control is passed to a window overlap control routine of FIG. 7 in the processing 93. In the window overlap control routine of FIG. 7, it is checked in processing 95 whether or not the pertinent window is completely concealed in the screen. In a case where the window 4-1 is completely concealed, control is transferred to an Icon window generate routine of FIG. 8 in processing 97. In the Icon window generate routine of FIG. 8, processing 98 is first executed to replace the rectangular information of the window 4-1 with the rectangular information of an Icon window area (the rectangular information of the Icon window 4-1' of FIG. 5b). The processing 98 is effected, for example, by substituting the display rectangular information of the window rectangle information 81b for that of the window rectangular information 81a.

Figure 5B:
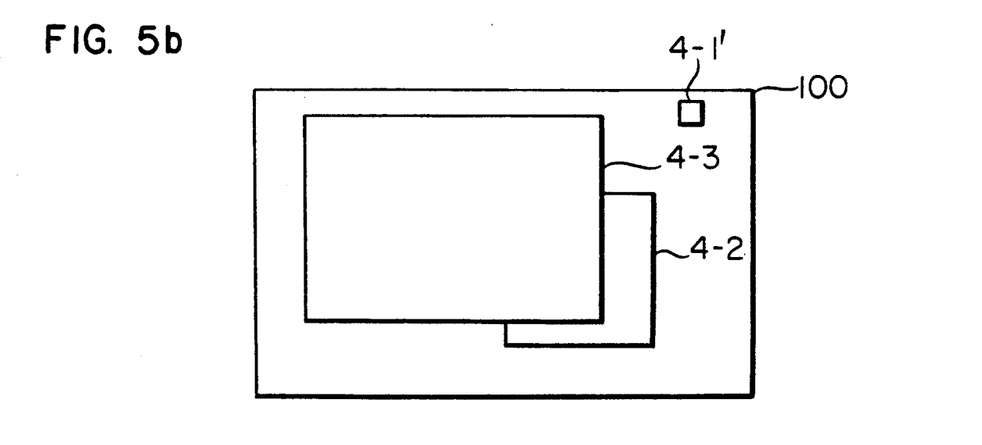
Figure 5C:
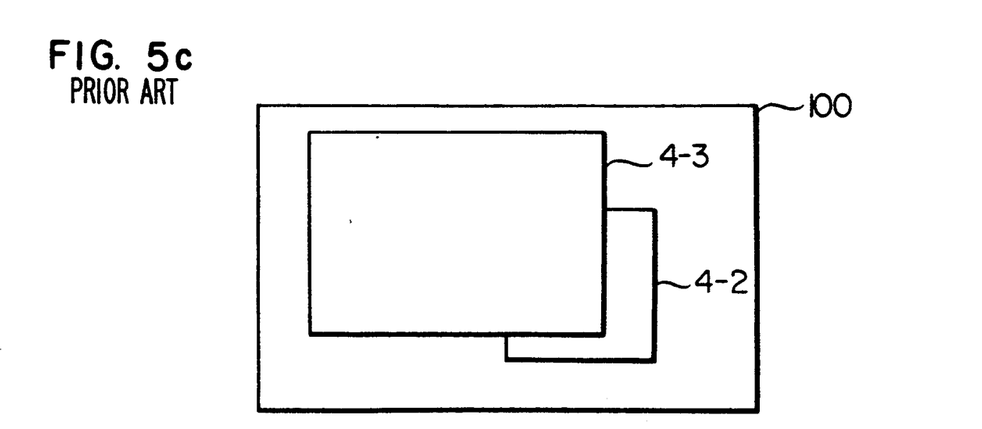

Next, in processing 99, the status information of the window rectangular information 81a is set to the Icon value, and then in processing 100, the address pointer of the window rectangular information 81a is cleared to $\phi$ (nulls). Moreover, in the processing 100, the window number 4-1 is deleted from the display priority control table 82, and the window number 4-1 is added to the Icon window table 83. As a result, the window 4-1 which is completely concealed as shown in FIG. 5c is displayed in the form of the Icon window 4-1' as shown in FIG. 5b.

When a partial overlap takes place in the case of the window 4-2 of FIG. 5a, processing 96 of FIG. 7 is executed to alter the display rectangular information is described above to thereby alter the window size of beforehand generated window and reduce the priority by one, and then control returns to the processing 94.

Furthermore, if the process of the window for which the Icon processing has been effected is in operation, the CPU 5 may execute the highlighting processing to change the display color of the Icon window by means of the display controller 6.

In the embodiment above, although the description has been given in a case where the pertinent window becomes invisible as a result of the generation of the new window, the present invention is not restricted by the embodiment but it is also applicable to a case where the window is concealed as a result of an alteration of the window size or a change of the window position.

As described above, according to the present invention, the operator can set an arbitrary window to be an operation objective window through a single operation and the state of the apparatus can be visually recognized, which leads to an effect that the man-machine interface is greatly improved.

While the present invention has been described with reference to the particular embodiments, it cannot be restricted by those embodiments but by the appended claims. It is to be appreciated that those skilled in the art can change or modify the embodiments without departing from the scope and spirit of the invention.

We claim:

1. A multiwindow control apparatus in a workstation having a multiwindow function comprising:

a central processing unit for executing a job program;

a display controller connected via a system bus to the central processing unit for controlling a display screen;

an input controller to which input devices such as a keyboard, a tablet, and a mouse are connected;

a program memory connected to the central processing unit for storing job programs including a sequence of processings to be executed by said central processing unit;

a private memory for storing control information of windows to be displayed on said display screen; and a display memory controlled by said display controller for storing screen data to be output to said display screen;

said private memory including a display priority control table for storing current window priority data of windows currently displayed on said display screen, an Icon window control table for storing window information represented by corresponding Icon windows and controlling a window to be set from an input device via the input controller, and a window control table for storing window information generated by referring to said display priority table and said Icon window control table, said display priority control table having stored therein data for causing Icons to have a higher display priority then all other data displayed on said display screen, a current cursor coordinate value buffer for indicating an indication point of the input device, and a specified coordinate value buffer storage area for temporarily storing coordinate values specified from the input device;

said program memory further including a window generation program which makes use of said control information stored in said private memory in a sequence of processings to be executed by said central processing unit for causing said central processing unit to perform the operations of effecting a judgement in response to input of a new window, said new window overlying at least one underlying window and being either a window recently generated by said multiwindow function of said workstation, a window beforehand generated whose size is changed, or a window whose position is altered, to determine whether each underlying window of said at least one underlying window is completely concealed by said new window, and displaying an Icon for each underlying window completely concealed by said new window, said Icon being generated to be recognizable by an operator as representative of said completely concealed underlying window and said Icon being displayed in an Icon window display area of said display screen.

2. A multiwindow control apparatus according to claim 1, wherein said window control table includes window information corresponding to n windows, each window information comprising:

rectangular information indicating a position of a window on a display screen;

status information indicating whether the rectangular information is associated with an Icon window or an ordinary window; and an address pointer and other information of rectangular information related to the Icon window.

3. A multiwindow control apparatus according to claim 1, wherein said Icon window control table includes storage areas for storing window numbers corresponding to window information to be displayed in m Icon windows.

* * * * *